United States Patent [19]
Kawamura et al.

[11] Patent Number: 5,513,182
[45] Date of Patent: Apr. 30, 1996

[54] STAR CONFIGURATION NETWORK SYSTEM

[75] Inventors: Harumi Kawamura, Tokyo; Keiko Satoh, Kanagawa, both of Japan

[73] Assignee: Sony Corporation, Tokyo, Japan

[21] Appl. No.: 441,679

[22] Filed: May 15, 1995

Related U.S. Application Data

[63] Continuation of Ser. No. 183,396, Jan. 19, 1994, abandoned.

[30] Foreign Application Priority Data

Feb. 1, 1993 [JP] Japan ..................... 5-036100

[51] Int. Cl.$^6$ ................................. H04L 12/44
[52] U.S. Cl. ............................................ 370/94.3
[58] Field of Search ................... 370/58, 60, 92, 370/93, 94.1, 94.2, 94.3, 85.13; 340/825.52, 825.53

[56] References Cited

U.S. PATENT DOCUMENTS 5,008,878  4/1991  Ahmadi et al. ................ 370/94.3
5,140,585  8/1992  Tomikawa ..................... 370/94.3

FOREIGN PATENT DOCUMENTS 0415169  3/1991  European Pat. Off. .
0467305  1/1992  European Pat. Off. .
WO9205648  4/1992  WIPO .

Primary Examiner—Melvin Marcelo
Assistant Examiner—Huy D. Vu
Attorney, Agent, or Firm—Jay H. Maioli

[57] ABSTRACT

A star configuration network system eliminating the need for reassigning addresses to the nodes constituting the system when any of the nodes is removed or relocated. The system comprises a first and a second node, a data processor and a controller. The first node has a plurality of connected terminals and offers a signal switching function. The second node offers a signal transmitting function and a signal receiving function and is connected to the first node. The data processor transmits and receives packet data between the first and the second nodes. The controller assigns addresses to all of the connected terminals of the first node. Each of the nodes of the network system is assigned a predetermined address common to all the nodes. The address of a connected terminal of one node as viewed from a connected terminal of the other node is represented by the address assigned by the controller to the connected terminal of that one node and by a connecting relationship between the two connected nodes, whereby the system transmits and receives packets of data between the two connected terminals.

36 Claims, 13 Drawing Sheets

CON1, CON2 : CONCENTRATOR
A, B, C, D, E : TERMINAL
[0]~[3] : RELATIVE ADDRESS

| VIEWED FROM | DESTINATION | ADDRESS |
|---|---|---|
| A | CON1 | [0] |
| A | B | [0. 2] |
| A | CON2 | [0. 3] |
| A | C | [0. 3. 1] |
| A | D | [0. 3. 2] |
| A | E | [0. 3. 3] |
| E | CON1 | [0. 0] |
| E | A | [0. 0. 1] |
| E | B | [0. 0. 2] |

FIG. 4(a)

| DESTINATION ADDRESS | SOURCE ADDRESS | PACKET TYPE | CONTENT (WHICH VARIES WITH PACKET TYPE) |
|---|---|---|---|

FIG. 4(b)

| DESTINATION ADDRESS | SOURCE ADDRESS | ORDINARY MAIL | MESSAGE |
|---|---|---|---|

FIG. 4(c)

| DESTINATION ADDRESS | SOURCE ADDRESS | ESTABLISHMENT OF LINE | END ADDRESS | STARTING ADDRESS | LINE TYPE | LINE ASSIGNMENT |
|---|---|---|---|---|---|---|

FIG. 4(d)

| DESTINATION ADDRESS | SOURCE ADDRESS | NOTICE OF LINE ESTABLISHMENT | END ADDRESS | STARTING ADDRESS | LINE TYPE | LINE ASSIGNMENT |
|---|---|---|---|---|---|---|

| | | | |
|---|---|---|---|
| O. O. * | □ | ORDINARY MAIL | CAN YOU BECOME VIDEO SOURCE ? |

TRANSMITTED BY A

FIG. 7(a)

| | | | |
|---|---|---|---|
| O. * | — | ORDINARY MAIL | CAN YOU BECOME VIDEO SOURCE ? |

REPEATED BY CON I

FIG. 7(b)

| | | | |
|---|---|---|---|
| O. O. * | □ | ORDINARY MAIL | ARE YOU CONCENTRATOR ? |

TRANSMITTED BY A

FIG. 7(c)

| | | | |
|---|---|---|---|
| O. * | — | ORDINARY MAIL | ARE YOU CONCENTRATOR ? |

REPEATED BY CON I

FIG. 7(d)

| | | | |
|---|---|---|---|
| FIG. 8(a) TRANSMITTED BY A | 0.* | □ | ORDINARY MAIL | CAN YOU BECOME VIDEO SOURCE ? |

| | | | |
|---|---|---|---|
| FIG. 8(b) REPEATED BY CON1 | * | — | ORDINARY MAIL | CAN YOU BECOME VIDEO SOURCE ? |

| | | | |
|---|---|---|---|
| FIG. 8(c) RECEIVED BY B | | 0.1 | ORDINARY MAIL | CAN YOU BECOME VIDEO SOURCE ? |

| | | | |
|---|---|---|---|
| FIG. 8(d) TRANSMITTED BY B | 0.1 | □ | ORDINARY MAIL | I CAN BECOME VIDEO SOURCE. |

| | | | |
|---|---|---|---|
| FIG. 8(e) REPEATED BY CON1 | 1 | 2 | ORDINARY MAIL | I CAN BECOME VIDEO SOURCE. |

| | | | |
|---|---|---|---|
| FIG. 8(f) RECEIVED BY A | | 0.2 | ORDINARY MAIL | I CAN BECOME VIDEO SOURCE. |

FIG. 9(a) TRANSMITTED BY A: | 0.* | □ | ORDINARY MAIL | ARE YOU CONCENTRATOR ? |

FIG. 9(b) REPEATED BY CON 1: | * | 1 | ORDINARY MAIL | ARE YOU CONCENTRATOR ? |

FIG. 9(c) RECEIVED BY CON 2: | 0.1 | 0.1 | ORDINARY MAIL | ARE YOU CONCENTRATOR ? |

FIG. 9(d) TRANSMITTED BY CON 2: | 0.1 | □ | ORDINARY MAIL | I AM CONCENTRATOR. |

FIG. 9(e) REPEATED BY CON 1: | 1 | 3 | ORDINARY MAIL | I AM CONCENTRATOR. |

FIG. 9(f) RECEIVED BY A: | | 0.3 | ORDINARY MAIL | I AM CONCENTRATOR. |

| Figure | Stage | Col1 | Col2 | Col3 |
|---|---|---|---|---|
| FIG. 10(a) | TRANSMITTED BY A | 0.3.* | □ | ORDINARY MAIL / CAN YOU BECOME VIDEO SOURCE ? |
| FIG. 10(b) | REPEATED BY CON 1 | 3.* | 1 | ORDINARY MAIL / CAN YOU BECOME VIDEO SOURCE ? |
| FIG. 10(c) | REPEATED BY CON 2 | * | 0.1 | ORDINARY MAIL / CAN YOU BECOME VIDEO SOURCE ? |
| FIG. 10(d) | RECEIVED BY D | | 0.0.1 | ORDINARY MAIL / CAN YOU BECOME VIDEO SOURCE ? |
| FIG. 10(e) | TRANSMITTED BY D | 0.0.1 | □ | ORDINARY MAIL / I CAN BECOME VIDEO SOURCE. |
| FIG. 10(f) | REPEATED BY CON 2 | 0.1 | 2 | ORDINARY MAIL / I CAN BECOME VIDEO SOURCE. |
| FIG. 10(g) | REPEATED BY CON 1 | 1 | 3.2 | ORDINARY MAIL / I CAN BECOME VIDEO SOURCE. |
| FIG. 10(h) | RECEIVED BY A | | 0.3.2 | ORDINARY MAIL / I CAN BECOME VIDEO SOURCE. |

FIG. 11(a) TRANSMITTED BY A

| 0.3.2 | □ | ORDINARY MAIL | ESTABLISH ONE VIDEO LINE. |
|---|---|---|---|

FIG. 11(b) REPEATED BY CON 1

| 3.2 | 1 | ORDINARY MAIL | ESTABLISH ONE VIDEO LINE. |
|---|---|---|---|

FIG. 11(c) REPEATED BY CON 2

| 2 | 0.1 | ORDINARY MAIL | ESTABLISH ONE VIDEO LINE. |
|---|---|---|---|

FIG. 11(d) RECEIVED BY D

| 0.0.1 | ORDINARY MAIL | ESTABLISH ONE VIDEO LINE. |
|---|---|---|

FIG. 12(a) TRANSMITTED BY D

| 0 | □ | ESTABLISHMENT OF LINE | 0.0.1 | □ | VIDEO | SLOT 1 |

FIG. 12(b) RECEIVED BY CON 2

| | 2 | ESTABLISHMENT OF LINE | 0.1 | 2 | VIDEO | SLOT 1 |

FIG. 12(c) TRANSMITTED BY CON 2

| 0 | □ | ESTABLISHMENT OF LINE | 0.1 | 2 | VIDEO | SLOT 3 |

FIG. 12(d) RECEIVED BY CON 1

| | 3 | ESTABLISHMENT OF LINE | 1 | 3.2 | VIDEO | SLOT 3 |

FIG. 12(e) TRANSMITTED BY CON 1

| 1 | □ | ESTABLISHMENT OF LINE | □ | 3.2 | VIDEO | SLOT 2 |

FIG. 12(f) RECEIVED BY A

| | 0 | ESTABLISHMENT OF LINE | □ | 0.3.2 | VIDEO | SLOT 2 |

| | | | | |
|---|---|---|---|---|
| 0 | □ | NOTICE OF LINE ESTABLISHMENT | □ | 0.3.2 | VIDEO | SLOT 2 |

FIG. 13(a) TRANSMITTED BY A

| | | | | |
|---|---|---|---|---|
| | 1 | NOTICE OF LINE ESTABLISHMENT | 1 | 3.2 | VIDEO | SLOT 2 |

FIG. 13(b) RECEIVED BY CON 1

| | | | | |
|---|---|---|---|---|
| 3 | □ | NOTICE OF LINE ESTABLISHMENT | 1 | 3.2 | VIDEO | SLOT 3 |

FIG. 13(c) TRANSMITTED BY CON 1

| | | | | |
|---|---|---|---|---|
| | 0 | NOTICE OF LINE ESTABLISHMENT | 0.1 | 2 | VIDEO | SLOT 3 |

FIG. 13(d) RECEIVED BY CON 2

| | | | | |
|---|---|---|---|---|
| 2 | □ | NOTICE OF LINE ESTABLISHMENT | 0.1 | 2 | VIDEO | SLOT 1 |

FIG. 13(e) TRANSMITTED BY CON 2

| | | | | |
|---|---|---|---|---|
| | 0 | NOTICE OF LINE ESTABLISHMENT | 0.0.1 | □ | VIDEO | SLOT 1 |

FIG. 13(f) RECEIVED BY D

FIG. 14(a)

| BASIC DATA | OPTIONAL DATA |
|---|---|

FIG. 14(b)

| COUNTER | MODE | INPUT | RESERVATION INFORMATION |
|---|---|---|---|
| 1H 23M 45S | REC | AUXILIARY 1 | DRAMA, FROM 10:00 p.m. TO 11:00 p.m., CHANNEL 6, EVERY FRIDAY |

STAR CONFIGURATION NETWORK SYSTEM

This is a continuation of application Ser. No. 08/183,396 filed Jan. 19, 1994 abandoned.

BACKGROUND OF THE INVENTION

1. Field of the Invention

The present invention relates to a star configuration network system and, more particularly, to a star configuration network system characterized by a novel method for designating the addresses of nodes constituting a network, by new procedures for establishing a line and by an improved method for transmitting data over the line.

2. Description of the Related Art

There exist so-called local area networks (LAN's) that connect workstations or personal computers located in a limited area. All nodes constituting such a network are each assigned an address when the network system is set up.

One known procedure for establishing a line in a network system is the LAPD (link access protocol D-channel) of the ISDN (integrated services digital network). The frame structure of the LAPD conforms to the frame format of the HDLC (high-level data link control). In this frame structure, a flag comes first that identifies the frame, followed by an address part that identifies a logical link, and lastly by a control part.

Known small-scale network systems include the HBS (home bus system), D2B (domestic digital bus system) and LANC (local application control bus system). In the HBS and D2B, data is transmitted after inquiries are made between the terminals involved (called the inquiry system hereunder). In the LANC, data is continuously transmitted while the line is being established (called the constant flow system hereunder). In connection with the present invention, European Patent Application Pub. No. 0,467,305 discloses a multi-master system wherein a computer is connected in daisy chain with audio-visual appliances for repeating packet signals and predetermined control signals therebetween under integrated control.

In systems such as a computer network where few nodes are relocated once each given an address, the conventional method of assigning addresses to the individual nodes is effective from a control point of view. However, the effectiveness of the method is diminished in systems such as an audio-visual network system configuring AV appliances because the nodes of such a system need to be addressed every time any of the nodes is removed or relocated, which occurs often.

The LAPD controls are intended for use with public switched networks. Thus the control procedures of the LAPD are complex and can overburden the control scheme of small-scale networks such as audio-visual appliance networks. In addition, the LAPD is not suited for networks whose nodes are not each assigned an absolute address.

The inquiry system adopted for the HBS and D2B is capable of acquiring information from a large number of terminals, but is not suitable for obtaining specific information from an individual terminal on a real time basis. For example, suppose that a video tape recorder (VTR) under the inquiry scheme is inquired as to its counter information repeatedly and responds thereto. In that case, one disadvantage is that the responses may fail to keep up with the repeated inquiries. Another disadvantage is that while the VTR is responding to an inquiry, it is impossible to acquire information from the other appliances configured. The constant flow system adopted for the LANC allows, say, counter information to be obtained in real time but requires huge amounts of information to be handled if a large number of appliances are configured and need to be tapped for information.

SUMMARY OF THE INVENTION

It is therefore an object of the present invention to overcome the above and other deficiencies and disadvantages of the prior art and to provide a star configuration network system that eliminates the need for reassigning addresses to the nodes constituting the system when any of the nodes is removed or relocated.

It is another object of the invention to provide a star configuration network system having procedures for establishing a line, the procedures being suitable for small-scale network systems with nodes not assigned absolute addresses.

It is a further object of the invention to provide a star configuration network system operating on a transmission method that combines the inquiry and constant flow systems to eliminate the traditional disadvantages of the two systems.

In carrying out the invention and according to one aspect thereof, there is provided a star configuration network system comprising: a first node having a plurality of connected terminals and offering a signal switching function; a second node offering a signal transmitting and receiving function and connected to the first node; a data processor for transmitting and receiving packet data between the first and the second nodes; and a controller for assigning addresses to all of the plurality of connected terminals of the first node, each of the configured nodes being assigned a predetermined address common to all the nodes, wherein the address of one node as viewed from the other node is represented by the address assigned to any one of the connected terminals of the first node and by a connecting relationship between the two connected nodes, whereby the system transmits and receives packets between the two connected terminals.

According to another aspect of the invention, there is provided a star configuration network system comprising: a first node having a plurality of connected terminals and offering a signal switching function; a plurality of second nodes each offering a signal transmitting and receiving function and each connected to the first node; a data processor for transmitting and receiving packet data and line-switched data between the first and the second nodes; and a controller for assigning addresses to all of the plurality of connected terminals of the first node, each of the configured nodes being assigned a predetermined address common to all the nodes, wherein the address of one node as viewed from another node is represented by the address assigned to any one of the connected terminals of the first node and by a connecting relationship between the two connected nodes, the controller setting a line over which to transmit the line-switched data by use of the packet having the starting and end addresses of the line.

According to a further aspect of the invention, there is provided a star configuration network system comprising: a first node having a plurality of connected terminals and offering a signal switching function; a plurality of second nodes each offering a signal transmitting and receiving function and each connected to the first node; a data processor for transmitting and receiving packet data and line-switched data between the first and the second nodes; and a controller for switching data by transmitting and receiving packets and line-switched data, wherein any one of said second nodes first makes an inquiry using a packet to detect another second node continuously transmitting desired status data, establishes with the detected second node a line over which to transmit status data, and receives the status data continuously transmitted over the established line from the detected second node.

In a preferred structure according to the invention, the first node is a concentrator and the second node is a terminal such as an audio-visual appliance (e.g., VTR).

In operation and according to the invention, the second node when transmitting a packet furnishes the message therein with a source address common to all nodes, as well as with a destination address represented by the individually assigned address of any one of the terminals connected to the first node and by a connecting relationship with the destination node. The first node when switching the packet rewrites the destination and source addresses thereof to those appropriate from its own viewpoint.

In addition, the second node when transmitting a packet furnishes the message therein with a source address common to all nodes as well as with a destination address represented by a relative address individually assigned to any one of the terminals connected to the first node and by a connecting relationship with the destination node. The first node when switching the packet rewrites a line end address and a line starting address thereof to those represented by the connecting relationship with the destination terminal, and establishes the line over which to transmit the line-switched data.

Furthermore, the inquiry scheme allows the first node to detect a second node continuously transmitting desired status data. When the appropriate second node is detected, the first node establishes with it a line over which to transmit the desired status data. Using the line thus established, the first node receives the status data continuously transmitted from the second node.

As outlined, the invention eliminates the need for the first and the second nodes to know their own addresses. When any node is relocated, there is no need to alter the node addresses.

In addition, with the first and the second nodes freed from the need to know their own addresses, a network system of a simple system structure composed of nodes having no absolute addresses is realized. That simplified system still allows the line for data transmission to be established as needed.

Furthermore, the combination of an inquiry system for packet transmission with a constant flow system for line-switched data transmission makes it possible to collect attribute data about numerous terminals (i.e., data indicating terminal types). This setup also allows a specific data item on an individual terminal to be acquired on a constant basis. It is also possible to obtain consecutively a plurality of data items about an individual terminal.

These and other objects, features and advantages of the invention will become more apparent upon a reading of the following description and appended drawings.

BRIEF DESCRIPTION OF THE DRAWINGS

FIGS. 4 (a) through 4 (d) are views of the basic packet structure for use with the embodiment;

FIGS. 7 (a) through 7 (d) are views showing procedures with which the first node searches for a node of the first concentrator in the embodiment;

FIGS. 8 (a) through 8 (f) are views depicting procedures with which the first terminal searches for a terminal connected to the first concentrator in the embodiment;

FIGS. 9 (a) through 9 (f) are views illustrating procedures with which the first terminal searches for the second concentrator in the embodiment;

FIGS. 10 (a) through 10 (h) are views showing procedures with which the first terminal searches for a terminal connected to the second concentrator in the embodiment;

FIGS. 11 (a) through 11 (d) are views indicating procedures with which the first terminal requests the fourth terminal to establish a line in the embodiment;

FIGS. 12 (a) through 12 (f) are views illustrating procedures with which the fourth terminal establishes a line through the first terminal in the embodiment;

FIGS. 13 (a) through 13 (f) are views depicting procedures with which the first terminal notifies establishment of the line through the fourth terminal in the embodiment; and FIGS. 14 (a) and 14 (b) are views showing typical status data transmitted between the first and the second terminals of the embodiment.

DETAILED DESCRIPTION OF PREFERRED EMBODIMENTS

Figures 1, 2:
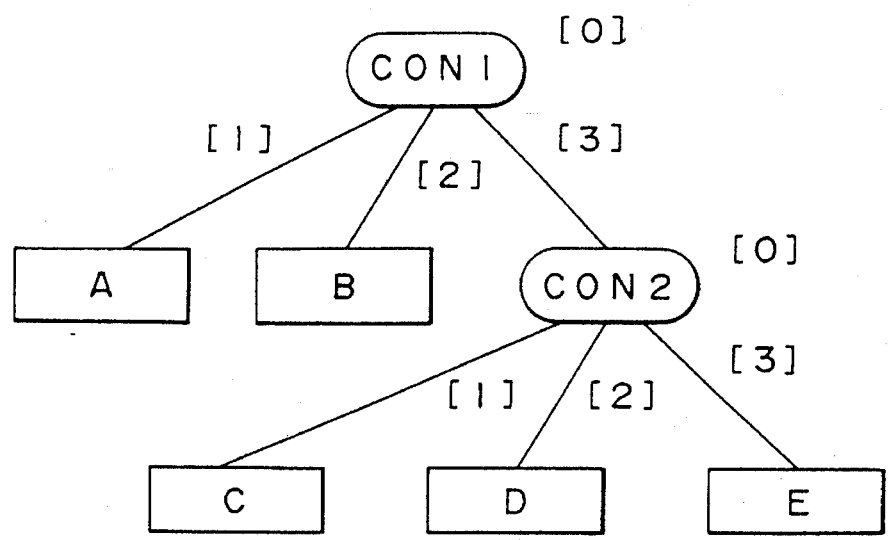
FIG. 1 is a block diagram of a star configuration network system embodying the invention.
FIG. 2 is a table describing how addresses are typically designated with the embodiment of FIG. 1.

Preferred embodiments of the invention will now be described with reference to the accompanying drawings. The description will proceed under the following headings:

[1] Configuration and addressing method of the network system (with reference to FIGS. 1 and 2)

Figure 3:
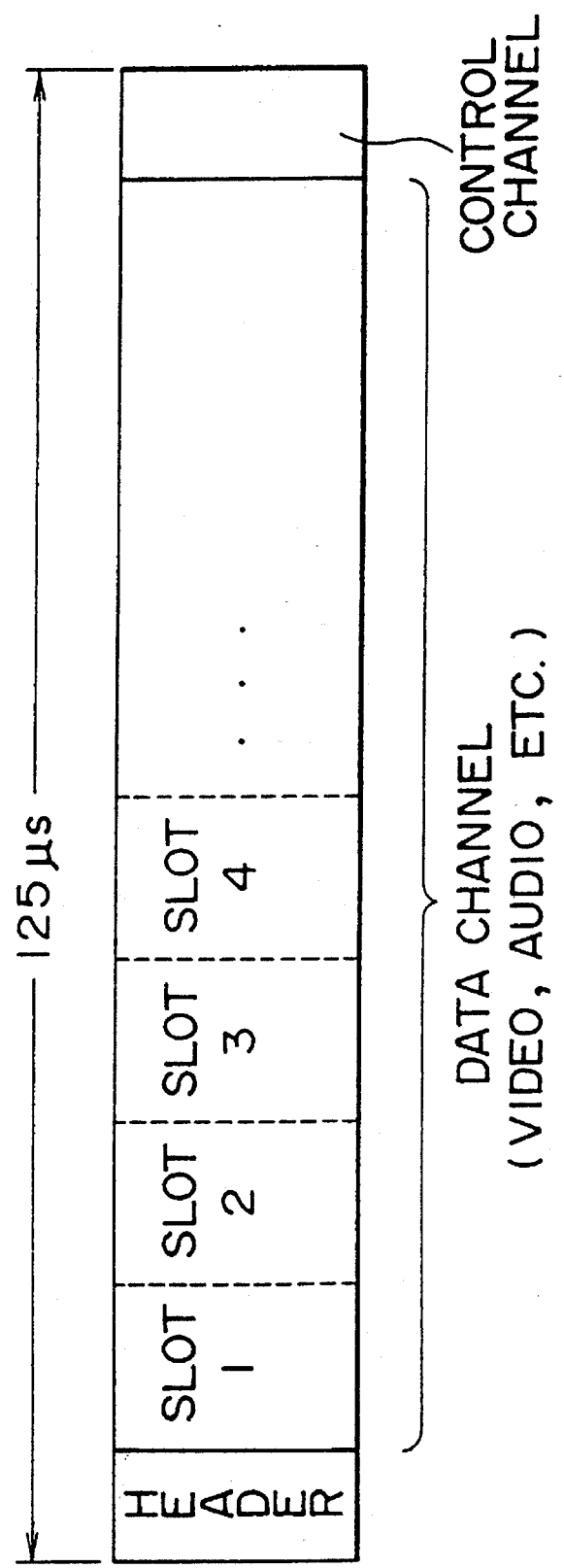
FIG. 3 is a view of a digital signal frame structure for use with the embodiment.

[2] Frame construction and basic packet structure (with reference to FIGS. 3 and 4(d))

Figure 5:
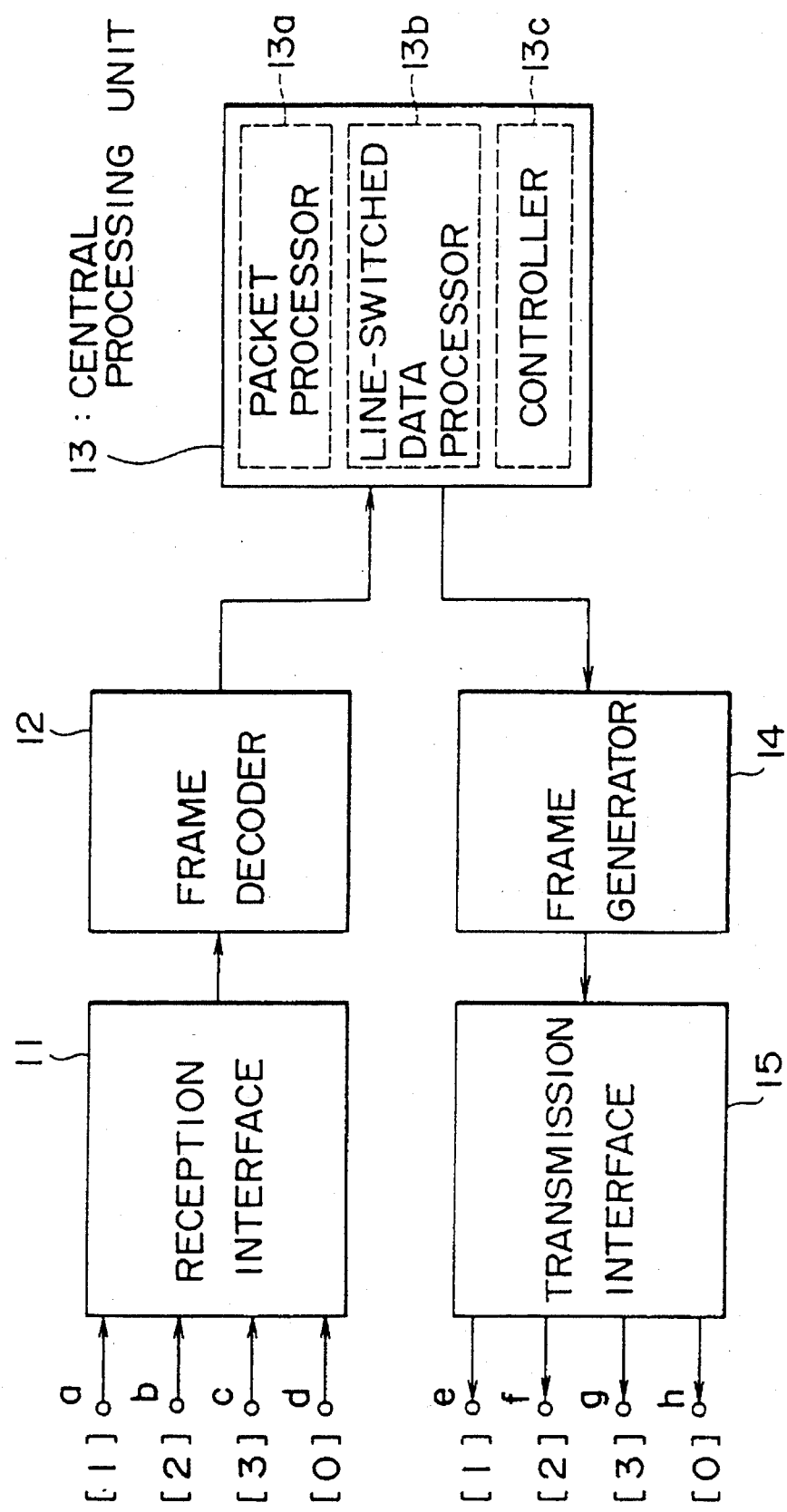
FIG. 5 is a block diagram of a typical concentrator structure for use with the embodiment.
Figure 6:
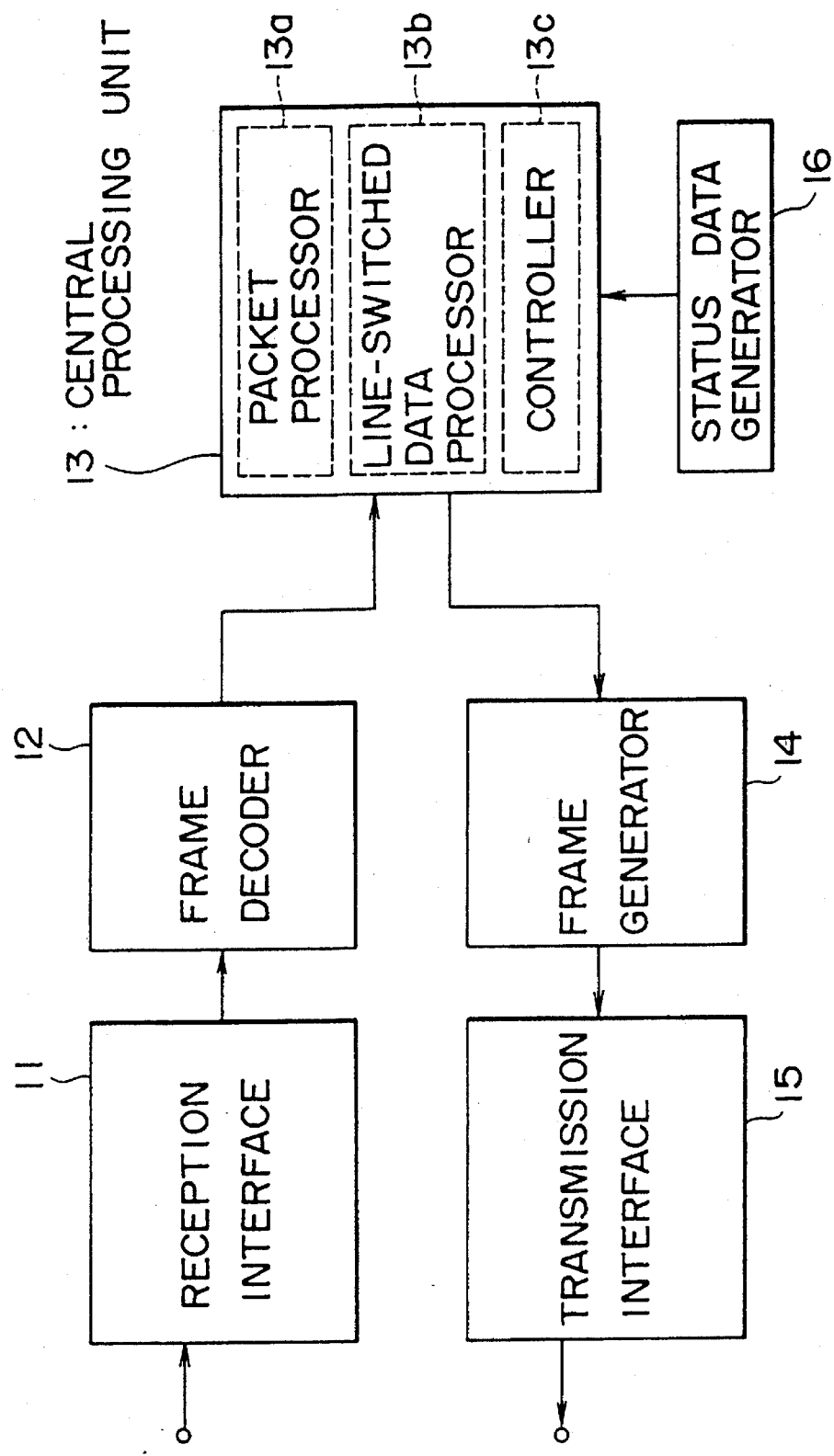
FIG. 6 is a block diagram of a typical terminal structure for use with the embodiment.

[3] Structures of concentrators and terminals (with reference to FIGS. 5 and 6)

[4] Search for the node acting as a video source (with reference to FIGS. 7(a) through 10(h))

[5] Establishment of a video line (with reference to FIGS. 11(a) through 13(f))

[6] Transmission and reception of status data between terminals (with reference to FIGS. 7(a) through 14(b))

[1] CONFIGURATION AND ADDRESSING METHOD OF THE NETWORK SYSTEM

FIG. 1 is a block diagram of a star configuration network system embodying the invention. This network system comprises a first and a second concentrator, CON1 and CON2, each having a line switching function and a packet switching function, and a first through a fifth terminal A–E, such as a VTR, a monitor, a CD player and a laser disc player. The two concentrators, as well as each concentrator and its terminals, are connected by optical fiber cables or the like. Digital signals are exchanged between these components on a full duplex basis.

The addressing method for the network system of the above configuration has seven major features: (1) each terminal has only one port connectable to a concentrator; (2) each concentrator has three ports for downward connection and one port for upward connection; (3) the concentrators and the terminals have no knowledge of their own addresses; (4) each concentrator assigns addresses [1], [2] and [3] to its downward connecting ports; (5) viewed from a terminal or from a concentrator, the node connected immediately thereabove has address [0]; (6) when one path is replaced by another to select a new terminal under a concentrator, the address of the new terminal additionally includes [.]; (7) each address is represented by a relative path notation.

When viewed from the first concentrator CON1, the first terminal A, the second terminal B, and the second concentrator CON2 have addresses [1], [2] and [3], respectively. Conversely, the address of the first concentrator CON1 is [0] when viewed from the first terminal A, the second terminal B, and the second concentrator CON2. Likewise, when viewed from the second concentrator CON2, the third terminal C, the fourth terminal D, and the fifth terminal E have addresses [1], [2] and [3], respectively. The address of the second concentrator CON2 is [0] when viewed from the third terminal C, the fourth terminal D, and the fifth terminal E.

The second terminal B as viewed from the first terminal A has address [0.2]. Conversely, the first terminal A as viewed from the second terminal B has address [0.1]. Similarly, the fifth address E as viewed from the third terminal C has address [0.3]; the third terminal C as viewed from the fifth terminal E has address [0.1].

The fourth terminal D as viewed from the first terminal A has address [0.3.2]. The first terminal A as viewed from the fourth terminal D has address [0.0. 1]. Part of the above addressing relationships are summarized in the table of FIG. 2.

[2] FRAME CONSTRUCTION AND BASIC PACKET STRUCTURE

FIG. 3 is a view of a digital signal frame structure for use with the network system embodying the invention. As illustrated, one frame is 8 kHz (125 µs) long. The frame is headed by a header and terminates with a control channel part. Between the header and the control channel part is a data channel part split into numerous time slots. The synchronizing of the 8 kHz frame is effected by the concentrator acting as the master. If there are two or more concentrators, as with the case in FIG. 1, the concentrator higher than the other(s) in a hierarchy acts as the master.

The header is made up of a specific pattern indicating the beginning of the frame. The control channel part is used to transmit and receive various control signals in packet format between nodes. The data channel is a channel that allows the video signal, audio signal, status signals of terminals, etc. to be transmitted and received on a line-switched basis. Illustratively, the video signal is transmitted or received using 400 slots over one line, while the audio signal is transmitted or received using 40 slots over one line. One slot is illustratively equivalent to 64 kbps, which serves as the unit for exchange between concentrators.

FIGS. 4 (a) through 4 (d) are views of the basic packet structure for use with the network system embodying the invention. As shown in FIG. 4 (a), a packet includes a destination address, a source address, a packet type and content. Illustratively, the packet type stands for ordinary mail, for a request for line establishment or for a notice of line establishment as depicted in FIGS. 4 (b) through 4 (d). A line type (FIGS. 4 (c), 4 (d)) represents a line for video data, a line for audio data, etc., while a line assignment (in the same figures) designates which time slot is to be used. If a plurality of time slots are needed, the number of the first time slot is designated by the line assignment.

In this embodiment, each node does not know its own address. Upon transmission, a node uses as its source address an address made of a predetermined code common to all nodes (a small square [□] with this embodiment). A concentrator repeats a packet by reading the destination address thereof. At this point, the concentrator rewrites the destination and source addresses of the packet into those deemed appropriate as viewed from that particular concentrator. The concentrator reads the data following the destination address only if the address designates that concentrator. If the destination address is an asterisk [*] designating broadcast, the concentrator repeats the data to all terminals connected thereto. Any data destined to a terminal has a one-digit destination address (i.e., without the [. ]). Because it has no address of its own, the terminal accepts the packet without scrutinizing the destination address thereof.

[3] STRUCTURES OF CONCENTRATORS AND TERMINALS

FIG. 5 is a block diagram of a typical concentrator structure for use with the embodiment. In FIG. 5, a reception interface 11 receives signals from another concentrator or terminal, regenerates a clock signal and decodes transmitted codes. The reception interface 11 has four ports a through d with addresses [0] through [3] assigned thereto, respectively.

A frame decoder 12 decodes the frame included in the output of the reception interface 11, converts the decoded frame from serial to parallel format, and feeds a central processing unit (CPU) 13 with a packet in the control channel part and with line-switched data in the time slots.

The CPU 13 comprises a processor, a RAM and a ROM. In functional terms, the CPU 13 includes a packet processor 13a, a line-switched data processor 13b and a controller 13c. The packet processor 13a detects, compares and rewrites the destination and source addresses attached to the received packet, acquires the message destined to the processor, and generates a response message in reply to that message. The line-switched data processor 13b establishes a line based on time slot selection and switches lines by switching time slots. The controller 13c detects the status of each of the components constituting the concentrator and controls these components.

A frame generator 14 generates a frame for output to a transmission interface 15. The frame is generated in accordance with either the packet or the line-switched data output by the CPU 13.

The transmission interface 15 is capable of outputting the frame signal after carrying out the conversion to a transmission code. The transmission interface 15 has four ports e through h with addresses [0] through [3] respectively assigned thereto.

FIG. 6 is a block diagram of a typical terminal structure for use with the embodiment. Between FIGS. 6 and 5, like reference numerals designate like or corresponding parts. The structure of the terminal is basically the same as that of the concentrator. The difference is that the reception interface 11 and transmission interface 15 of the terminal have only one port each (p, q) and that the packet processor 13a of the terminal does not check the destination address of the received packet. It is possible to make arrangements so that the destination address in the packet received by the frame decoder 12 is kept from being supplied to the CPU 13. The terminal further includes a status data generator 16 that generates status data indicating the status of the terminal.

[4] SEARCH FOR THE NODE ACTING AS VIDEO SOURCE

Described below with reference to FIGS. 7(a) through 10(h) are the procedures with which the first terminal A of the network system searches for a node acting as a video source (it is assumed that the second or the fourth terminal B or D can become this node).

The first terminal A knows that there is a concentrator configured thereabove but does not know if a hierarchy exists above the concentrator. Under this condition, the first terminal A transmits the packet of FIG. 7 (a) for broadcast to any terminals that may exist above the first concentrator CON1. Referring to the block diagram of FIG. 6, the packet processor 13a generates a packet comprising the content saying "Can you become a video source?," the packet type "ordinary mail," the source address [□] and the destination address [0.0. *], and sends the packet to the frame generator 14. The frame generator inserts these items into the control channel part and prefixes the frame with a header so as to generate a frame signal for output to the transmission interface 15. The transmission interface 15 transmits the frame signal via the port q.

The first concentrator CON1 rewrites the source and destination addresses of the packet into those shown in FIG. 7 (b), and has the packet transmitted to it. Referring to the block diagram of FIG. 5, the frame signal input from the port a is fed to the frame decoder 12 via the reception interface 11. The frame decoder 12 retrieves the packet of FIG. 7 (a) from the control channel part of the frame signal, and forwards the packet to the packet processor 13a. The packet processor 13a rewrites the source address into [1] and the destination address into [0. *], and supplies the frame generator 14 with the new addresses along with the packet content saying "Can you become a video source?" Using these data items, the frame generator 14 generates a frame signal and sends it to the transmission interface 15. The transmission interface 15 outputs the frame signal via the port h. The selection of the port h is performed by verifying the destination address [0. *] under control of either the controller 13c or the transmission interface 15.

Since no terminal exists above the first concentrator CON1, the first concentrator CON1 receives no response. Thus the first terminal A, too, receives no response.

After verifying that no response has returned, the first terminal A checks to see if another concentrator exists above the first concentrator CON1. The check is carried out by outputting the packet of FIG. 7 (c) to the first concentrator CON1. The first concentrator CON1 rewrites the source and destination addresses of the received packet into those of the packet in FIG. 7 (d) and repeats the new packet. Since no concentrator exists above the first concentrator CON1, no response is received.

The first terminal A then checks for terminals that may be connected to the concentrator above the terminal. The check is made by transmitting the packet of FIG. 8 (a) to the concentrator CON1. The concentrator CON1 rewrites the source and destination addresses of the received packet into those of the packet in FIG. 8 (b), and transmits the new packet to the nodes configured below the concentrator (i.e., the nodes being the first terminal A, second terminal B and second concentrator CON2). Upon receipt of the packet, the second terminal B rewrites its source address into that of the packet in FIG. 8 (c) and acquires the content of the new packet.

Because the second terminal B can become a video source, it generates the packet of FIG. 8 (d) and transmits it to the first concentrator CON1. The first concentrator CON1 rewrites the source and destination addresses of the received packet into those of the packet in FIG. 8 (e), and sends the new packet to the first terminal A. On receiving the packet, the first terminal A rewrites its source address into that of the packet in FIG. 8 (f) and acquires the content of the new packet. This allows the first terminal A to know that the node having address [0.2] can become the video source.

The first terminal A then checks to see if any concentrator is configured below the concentrator that is currently configured above the terminal A. The check is made by transmitting the packet of FIG. 9 (a) to the first concentrator CON1. The first concentrator CON1 rewrites the source and destination addresses of the received packet into those of the packet in FIG. 9 (b), and transmits the new packet to the nodes configured below. The second concentrator CON2 receives the packet, rewrites its source address into that of the packet in FIG. 9 (c) and acquires the content of the new packet.

Being a concentrator, the second concentrator CON2 generates the packet of FIG. 9 (d) and returns it to the first concentrator CON1. The first concentrator CON1 rewrites the source and destination addresses of the received packet into those of the packet in FIG. 9 (e), and sends the new packet to the first terminal A. Upon receipt of the packet, the first terminal A rewrites its source address into that of the packet in FIG. 9 (f) and acquires the content of the new packet. This allows the first terminal A to know that the node having address [0.3] is a concentrator.

Next, the first terminal A checks for nodes that may be configured below the concentrator having address [0.3]. The check is made by transmitting the packet of FIG. 10 (a) to the first concentrator CON1 and second concentrator CON2. The first and the second concentrators CON1 and CON2 rewrite the source and destination addresses of the received packet into those of the packets in FIGS. 10 (b) and 10 (c), respectively. The new packet is passed on to the fourth terminal D. On receiving the packet, the fourth terminal D rewrites its source address into that of the packet in FIG. 10 (d) and acquires the content of the new packet.

Because the fourth terminal D can become the video source, it generates the packet of FIG. 10 (e) and sends it to the second concentrator CON2 and first concentrator CON1. The second and the first concentrators CON2 and CON1 rewrite the source and destination addresses of the received packet into those of the packets in FIGS. 10 (f) and 10 (g), respectively. The new packet is passed on to the first terminal A. When receiving the packet, the first terminal A rewrites its source address to that of the packet in FIG. 10 (h) and acquires the content of the new packet. This allows the first terminal A to know that the node having address [0.3.2] can become the video source.

In like manner, a check is made to see if any concentrator is configured below the concentrator having address [0.3]. The absence of any response reveals that no other concentrator is furnished below the concentrator having address [0.3].

The procedures described above allow the first terminal A to know that the node which may act as a video source within the network system is any one of the nodes having addresses [0.2] and [0.3.2].

[5] ESTABLISHMENT OF VIDEO LINE

Described below with reference to FIGS. 11 (a) through 13 (f) are the procedures with which to establish a video line between the first terminal A and the node (the fourth terminal D) having address [0.3. 2] and acting as the video source. Although one video line illustratively utilizes as many as 400 time slots, the example cited below utilizes just one slot for easy comprehension.

(1) Requesting The Establishment Of A Line

The first terminal A transmits the packet of FIG. 11 (a) to request the establishment of a video line with the node having address [0.3.2]. The first concentrator CON1 and second concentrator CON2 rewrite the source and destination addresses of the received packet to those of the packets in FIGS. 11 (b) and 11 (c), respectively. The new packet is passed on to the fourth terminal D. On receiving the packet, the fourth terminal D rewrites its source address into that of the packet in FIG. 11 (d) and acquires the content of the new packet. This allows the fourth terminal D to know that the node having address [0.0.1] is requesting the establishment of one video line.

(2) Establishing The Line

The line is established from the fourth terminal D to the first terminal A as follows: the line is first established from the fourth terminal D to the second concentrator CON2. The line is then established from the second concentrator CON2 to the first concentrator CON1. Finally the line is established from the first concentrator CON1 to the first terminal A.

Initially, the fourth terminal D transmits the packet of FIG. 12 (a) in order to establish the line to the second concentrator CON2. It is assumed here that slot 1 is used for this transmission. Upon receipt of the packet, the second concentrator CON2 rewrites the source address, end address and starting address thereof into those of the packet in FIG. 12 (b) and acquires the content of the new packet. This allows the second concentrator CON2 to know that slot 1 is to be connected to an upward appliance. It is assumed here that the use of slot 1 between the fourth terminal D and the second concentrator CON2 is designated beforehand by a RAM or a register in the respective CPU's 13.

The second concentrator CON2 then transmits the packet of FIG. 12 (c) so as to establish the line to the first concentrator CON1. It is assumed here that slot 3 is utilized for the transmission. When receiving the packet, the first concentrator CON1 rewrites the source address, end address and starting address thereof into those of the packet in FIG. 12 (d) and acquires the content of the new packet. This allows the first concentrator CON to know that slot 3 is to be connected to address [1].

The first concentrator CON1 then transmits the packet of FIG. 12 (e) in order to establish the line to the first terminal A. It is assumed here that slot 2 is employed for the transmission. On receiving the packet, the first terminal A rewrites the source address, end address and starting address thereof into those of the packet in FIG. 12 (f) and acquires the content of the new packet. This allows the first terminal A to know that it has the video line connected thereto.

An alternative to the procedure (1) above for requesting the establishment of a line is for the first terminal A to initiate establishment of the line therefrom. In that case, the packet that each node forwards does not include a slot number. This is because the higher or upstream node of any two nodes in the signal flow always secures a slot.

(3) Notifying The Establishment Of The Line

The first terminal A notifies the fourth terminal D of the establishment of the line as follows: the first terminal A initially transmits the packet of FIG. 13 (a). Upon receipt of the packet, the first concentrator CON1 rewrites the source address, end address and starting address thereof into those of the packet in FIG. 13 (b) and acquires the content of the new packet.

The first concentrator CON1 then generates the packet of FIG. 13 (c) and transmits it to the second concentrator CON2. When receiving the packet, the second concentrator CON2 rewrites the source address, end address and starting address thereof into those of the packet in FIG. 13(d) and acquires the content of the new packet.

The second concentrator CON2 generates the packet of FIG. 13 (e) and transmits it to the fourth terminal D. Upon receipt of the packet, the fourth terminal D rewrites the source address, end address and starting address thereof into those of the packet in FIG. 13 (f) and acquires the content of the new packet. This allows the fourth terminal D to know that one video line is now established with the node having address [0.0.1].

The slot numbers in the packets of FIGS. 13 (a) through 13 (e) may be omitted. The example above has described the case where it is possible to establish the line between the first terminal A and the fourth terminal D. If the line failed to be established halfway in that example, the unavailability of the line would be notified at that point.

[6] TRANSMISSION AND RECEPTION OF STATUS DATA BETWEEN TERMINALS

What follows is a description of how terminal status data of the inventive network system (e.g., VTR tape counter data) is displayed on a monitor. It is assumed here that the first terminal A is a monitor and the second terminal B is a VTR.

For the first terminal A to display VTR status data requires searching initially for a VTR that should exist within the network. One conventional way to perform this search is as follows: using the procedures depicted with reference to FIGS. 7(a) through 10(h), the first terminal A initially searches for terminals that may each act as a video source. The first terminal A then requests that a line be established with the terminals acting as video sources, the line being used to received status data from the latter. With the line established, the first terminal A receives from these terminals their status data and terminal type data (identifying them as a VTR, laser disc player, etc.). The first terminal A finds the status data of the VTR from among the data thus collected. One disadvantage of the above method is that it takes time to establish the line. Another disadvantage is that it is necessary to handle data of numerous types received from those terminals involved which continuously supplies diverse kinds of status data.

By contrast, the embodiment of the invention first searches for the VTR within the network through packet switching, establishes the line with the VTR detected, and exchanges status data therewith through line switching. More specifically, the embodiment performs the following:

In order to search for the VTR within the network, the first terminal A gets the packet content to say "Respond if you are VTR," sets the destination address to [*] (for broadcast), and executes the procedures described with reference to FIGS. 7 (a) through 10 (h). The node (the second terminal B) having address [0.2] returns the response saying "I am VTR," which allows the first terminal A to know the presence of the VTR and the address thereof.

Using the procedures explained with reference to FIGS. 11 (a) through 13 (f), the first terminal A then establishes the line with the node having address [0.2] by securing a time slot in which to receive status data therefrom through line switching.

Next, the second terminal B transmits the secured time slot in which the status data is placed. The status data comprises basic data and optional data. The basis data is data that is basic in nature, is not large in quantity but needs to be transmitted continuously, such as counter data, operation mode data (REC, PB, etc.), input switching data (terrestrial wave tuner, broadcast satellite (BS) tuner, communications satellite (CS) tuner, auxiliary input, etc.). The optional data is data that is large in quantity but need not be transmitted continuously, such as reservation information. Because the data transmitted through line switching is kept transmitted under the constant flow scheme, only the data that is transmitted from the sources is made available. This bottleneck is bypassed by this embodiment which splits one slot into two areas, as shown in FIGS. 14 (a) and 14 (b), the first area accommodating the basic data and the second area holding the optional data. Using a packet, the receiving side (i.e., the first terminal A in this example) issues a request as needed designating the kind of optional data required. This allows the receiving side to acquire optional data whenever necessary in addition to the basic data that is constantly needed. The new scheme makes it possible to exchange significantly increased amounts of data within the network without overburdening its capabilities.

Although the description above contains many specificities, these should not be construed as limiting the scope of the invention but as merely providing illustrations of the presently preferred embodiment of this invention. For example, in the description made with reference to FIGS. 11(a) through 13(f), the signal receiving side (i.e., first terminal A) requests the signal transmitting side (i.e., fourth terminal D) using a packet to initiate establishment of the line therebetween. The transmitting side then performs what is requested. Alternatively, suppose that one terminal (e.g., BS tuner) searches for another terminal (e.g., VTR) and transmits the video signal to the latter over a line established therebetween. In that case, the signal transmitting side (i.e., BS tuner) may initiate establishment of the line.

Thus the scope of the invention should be determined by the appended claims and their legal equivalents, rather than by the examples given.

What is claimed is:

1. A star configuration data network system comprising:
    a first node having a plurality of connected terminals for providing a signal switching function;
    a second node for providing a signal transmitting function and a signal receiving function, said second node being connected to said first node;
    a data processor for transmitting and receiving data in a form of packets between said first node and said second node; and
    a controller for assigning addresses to said first node, said second node, and the plurality of connected terminals of said first node, wherein nodes of the network system are assigned a single predetermined common address as viewed from respective nodes or terminals connected both thereto and downstream in a signal flow direction, wherein the address of a more upstream one in the signal flow direction of said first node and said second node as viewed from the other of said first node and said second node is represented by the single predetermined common address, whereby the system transmits and receives the packets of the data between said first node and said second node or between said first node and said plurality of terminals connected to said first node.

2. A star configuration data network system according to claim 1, wherein each packet of data comprises a plurality of frames including a header frame of a specific pattern indicating a head of said packet of data, an end of said packet being identified by a control channel frame for allowing various control signals to be transmitted and received in packet data format between nodes.

3. A star configuration network system according to claim 2, wherein between said header frame and said control channel frame of said packet data is arranged a data channel frame for transmitting and receiving a plurality of signals.

4. A star configuration data network system according to claim 3, wherein said data channel frame comprises a plurality of time slots.

5. A star configuration data network system according to claim 1, wherein said first node is connected to said second node in a hierarchical structure in which one node comes above the other node, the higher node acting as a master.

6. A star configuration network system according to claim 5, wherein said first node and said second node use respective source addresses composed of a common predetermined code when transmitting data because the nodes are incapable of recognizing the addresses assigned thereto, respectively.

7. A star configuration data network system according to claim 6, wherein one of said first and said second nodes is a concentrator for repeating received packets of data by reading destination addresses thereof and by rewriting destination and source addresses of a received packet into corresponding addresses as viewed from said concentrator.

8. A star configuration network system according to claim 7, wherein said concentrator repeats data of the received packet to all terminals connected thereto if the destination address of the received packet includes an address designating a data repeat operation.

9. A star configuration network system according to claim 8, wherein said concentrator comprises:
    a reception interface for receiving signals from any one of another concentrator and terminals, for regenerating a clock signal, for decoding transmission codes, and for outputting a frame corresponding to the received signals;
    a frame decoder for decoding the frame output by said reception interface, converting the decoded frame from serial to parallel format, and outputting packet data for said control channel part and line-switched data for the time slots correspondingly; and
    a central processing unit for controlling an operation of said concentrator according to the packet data and the line-switched data output by said frame decoder, and outputting packet data or line-switched data.

10. A star configuration network system according to claim 9, wherein said central processing unit comprises:

a packet processor for detecting, comparing and rewriting the destination and source addresses attached to the received packet, for generating a message destined to another concentrator, and for supplying the packet data output by said central processing unit;

a line-switched data processor for establishing a line based on time slot selection and for switching lines by switching time slots; and a controller for detecting the status of each of the components constituting said concentrator and for controlling said components.

11. A star configuration network system according to claim 10, wherein said concentrator further comprises:

a frame generator for generating a frame in accordance with either the packet data or the line-switched data output by said central processing unit; and a transmission interface for converting the frame generated by said frame generator to a transmission code and outputting the transmission code.

12. A star configuration data network system according to claim 1, wherein said plurality of connected terminals are audio-visual appliances.

13. A star configuration network system comprising:

a first node having a plurality of connected terminals for providing a signal switching function;

a plurality of second nodes each providing a signal transmitting function and a signal receiving function and each being connected to said first node;

a data processor for transmitting and receiving data in a form of packet data and line switched data between said first node and said plurality of second nodes; and a controller for assigning addresses to said first node, said plurality of second nodes, and the plurality of connected terminals of said first node, wherein nodes of the network system are assigned a single predetermined common address as viewed from respective nodes connected both thereto and downstream in a signal flow direction, and wherein the address of a more upstream one in a signal flow direction of two connected nodes as viewed from the other of the two connected nodes is represented by the single predetermined common address, said controller setting a line over which to transmit said line switched data between said first node and one of said plurality of second nodes by use of the packet data.

14. A star configuration network system according to claim 13, wherein said packet data comprises a frame headed by a header of a specific pattern indicating a head of said frame, an end of said frame being identified by a control channel part for allowing various control signals to be transmitted and received in packet format between nodes.

15. A star configuration network system according to claim 14, wherein between said header and said control channel part of said packet data is arranged a data channel for transmitting and receiving a plurality of signals.

16. A star configuration network system according to claim 15, wherein said data channel comprises a plurality of time slots.

17. A star configuration network system according to claim 13, wherein said first node is connected to said plurality of second nodes in a hierarchical structure in which one of the two connected nodes comes above the other of the two connected nodes, the higher node acting as a master.

18. A star configuration network system according to claim 17, wherein said first node and said plurality of second nodes use respective source addresses composed of a common predetermined code when transmitting data because the nodes are incapable of recognizing the addresses assigned thereto.

19. A star configuration network system according to claim 18, wherein one of said first node and said plurality of second nodes is a concentrator for repeating received data packets by reading destination addresses thereof and by rewriting destination and source addresses of a received packet into corresponding addresses as viewed from said concentrator.

20. A star configuration network system according to claim 19, wherein said concentrator repeats data of the received packet to all terminals connected thereto if the destination address of the received packet includes an address designating a data repeat operation.

21. A star configuration network system according to claim 20, wherein said concentrator comprises:

a reception interface for receiving signals from any one of other concentrators and terminals, for regenerating a clock signal, for decoding transmission codes, and for outputting a frame corresponding to the received signals;

a frame decoder for decoding the frame output by said reception interface, converting the decoded frame from serial to parallel format, and outputting packet data for said control channel part and line-switched data for the time slots correspondingly; and a central processing unit for controlling an operation of said concentrator according to the packet data and the line-switched data output by said frame decoder, and outputting packet data or line-switched data.

22. A star configuration network system according to claim 21, wherein said central processing unit comprises:

a packet processor for detecting, comparing and rewriting the destination and source addresses attached to the received packet, for generating a message destined to another concentrator, and for supplying the packet data output by said central processing unit;

a line-switched data processor for establishing a line based on time slot selection and for switching lines by switching time slots; and a controller for detecting the status of each of the components constituting said concentrator and for controlling said components.

23. A star configuration network system according to claim 22, wherein said concentrator further comprises:

a frame generator for generating a frame in accordance with either the packet data or the line-switched data output by said central processing unit; and a transmission interface for converting the frame generated by said frame generator to a transmission code and outputting the transmission code.

24. A star configuration data network system according to claim 13, wherein said plurality of connected terminals are audio-visual appliances.

25. A star configuration data network system comprising:

a first node having a plurality of connected terminals for providing a signal switching function;

a plurality of second nodes each providing a signal transmitting function and a signal receiving function and each being connected to said first node;

a data processor for transmitting and receiving data in a form of packet data and line-switched data between said first node and said plurality of second nodes; and a controller for assigning addresses to said first node, said plurality of second nodes, and the plurality of connected terminals of said first node, wherein nodes of the network system are assigned a single predetermined common address as viewed from respective nodes connected both thereto and downstream in a signal flow direction, and for switching said packet data and said line-switched data transmitted and received by said data processor, wherein any one of said plurality of second nodes first makes an inquiry using a packet to detect another of said plurality of second nodes continuously transmitting desired status data, establishes with said detected another of said plurality of second nodes a line over which to transmit status data, and receives the status data continuously transmitted over the established line from said detected another of said plurality of second nodes.

26. A star configuration network system according to claim 25, wherein said packet data comprises a frame headed by a header of a specific pattern indicating a head of said frame, an end of said frame being identified by a control channel part for allowing various control signals to be transmitted and received in packet format between nodes.

27. A star configuration network system according to claim 26, wherein between said header and said control channel part of said packet data is arranged a data channel for transmitting and receiving a plurality of signals.

28. A star configuration network system according to claim 27, wherein said data channel comprises a plurality of time slots.

29. A star configuration network system according to claim 25, wherein said first node is connected to said plurality of second nodes in a hierarchical structure in which one of the two connected nodes comes above the other of the two connected nodes, the higher node acting as a master.

30. A star configuration network system according to claim 29, wherein said first node and said plurality of second nodes use respective source addresses composed of a common predetermined code when transmitting data because the nodes are incapable of recognizing the addresses assigned thereto.

31. A star configuration network system according to claim 30, wherein one of said first node and said plurality of second nodes is a concentrator for repeating received packets of data by reading destination addresses thereof and by rewriting destination and source addresses of a received packet into corresponding addresses as viewed from said concentrator.

32. A star configuration network system according to claim 31, wherein said concentrator repeats data of the received packet to all terminals connected thereto if the destination address of the received packet includes an address designating a data repeat operation.

33. A star configuration network system according to claim 32, wherein said concentrator comprises:

a reception interface for receiving signals from any one of other concentrators and terminals, for regenerating a clock signal, for decoding transmission codes, and for outputting a frame corresponding to the received signals;

a frame decoder for decoding the frame output by said reception interface, converting the decoded frame from serial to parallel format, and outputting packet data for said control channel part and line-switched data for the time slots correspondingly; and a central processing unit for controlling an operation of said concentrator according to the packet data and the line-switched data output by said frame decoder, and outputting packet data or line-switched data.

34. A star configuration network system according to claim 33, wherein said central processing unit comprises:

a packet processor for detecting, comparing and rewriting the destination and source addresses attached to the received packet, for generating a message destined to another concentrator, and for supplying the packet data output by said central processing unit;

a line-switched data processor for establishing a line based on time slot selection and for switching lines by switching time slots; and a controller for detecting the status of each of the components constituting said concentrator and for controlling said components.

35. A star configuration network system according to claim 34, further comprising a frame generator for generating a frame for output to a transmission interface, said frame being generated in accordance with either the packet or the line-switched data output by said central processing unit.

36. A star configuration data network system according to claim 25, wherein said plurality of connected terminals are audio-visual appliances.

* * * * *